United States Patent Office 3,507,170
Patented Apr. 21, 1970

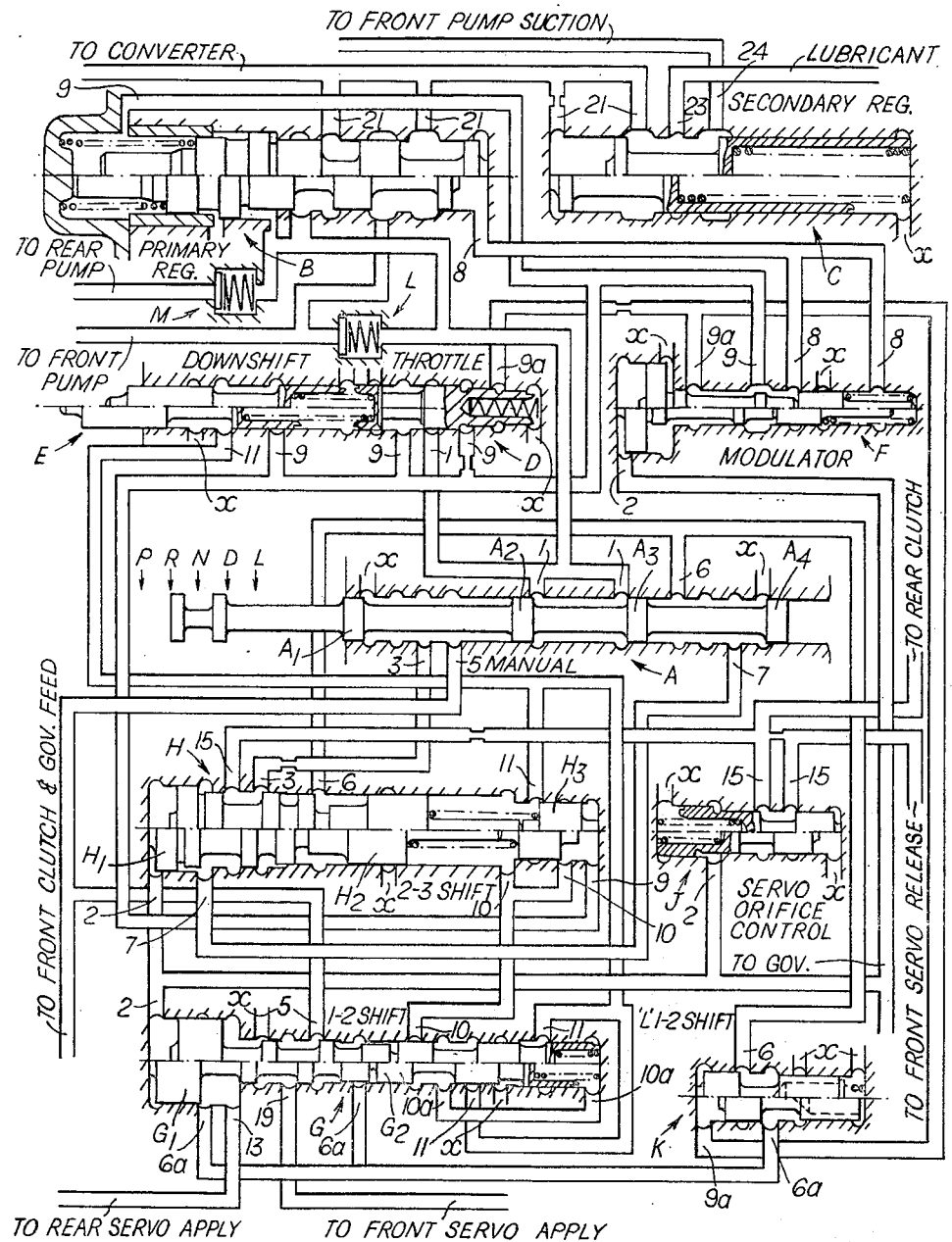

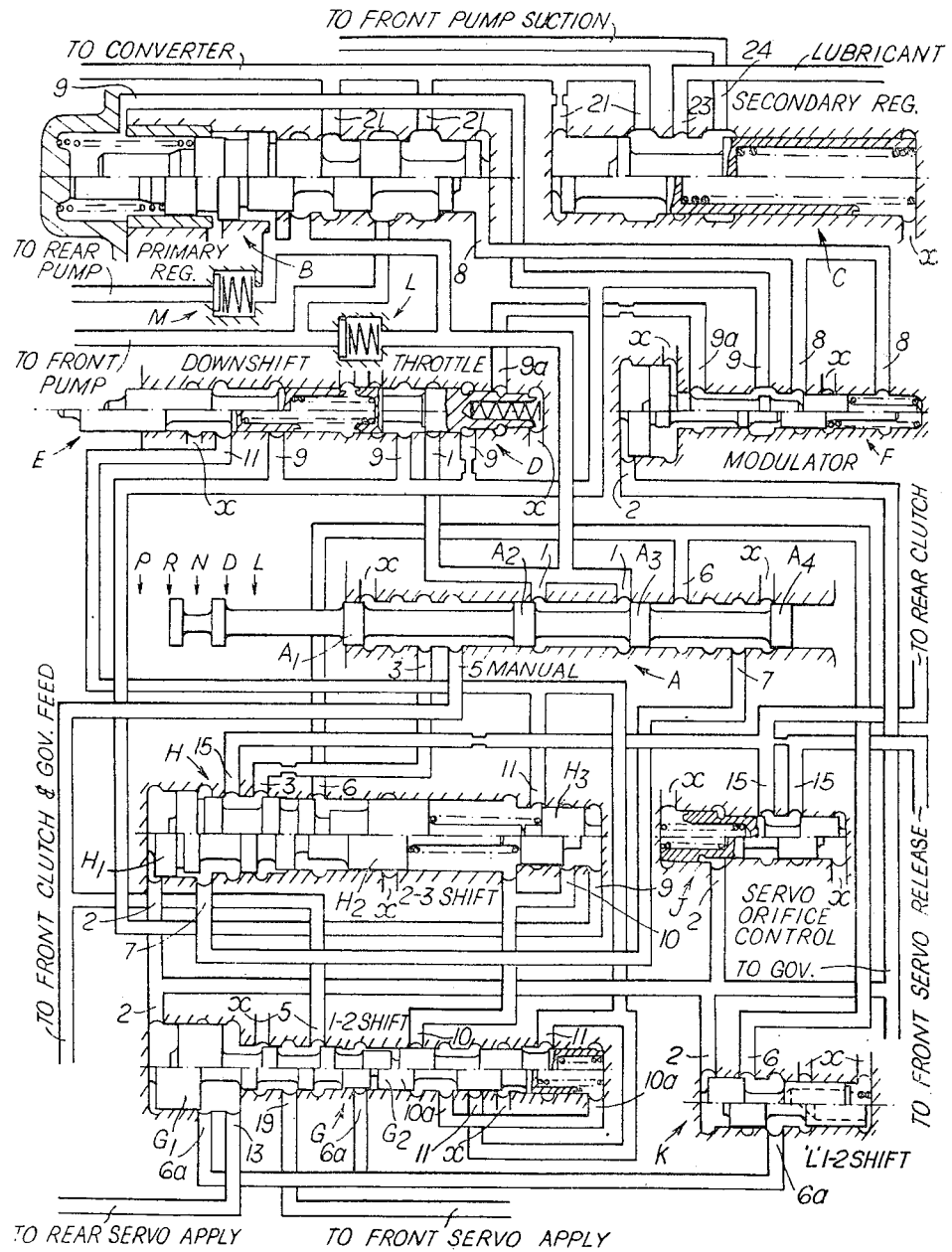

3,507,170
VARIABLE SPEED TRANSMISSION MECHANISM
Carl Wesley Hanzi, Hitchin, and Gordon Francis Hayden, Hinxworth, near Baldock, England, assignors to Borg-Warner Limited, Letchworth, England, a British company
Filed Mar. 18, 1968, Ser. No. 714,132
Int. Cl. B60k 21/06
U.S. Cl. 74—869               6 Claims

ABSTRACT OF THE DISCLOSURE

The invention relates to a hydraulic control mechanism for automobile automotive transmissions, which serves to oppose movement to a downshift position of a shift valve which controls change from top gear, until governor pressure has fallen below a given value. The mechanism also permits shift up from bottom to intermediate gear when the selector is in the low position.

---

This invention relates to variable speed transmission mechanisms for automotive vehicles.

The control system for an automatic transmission ordinarily comprises one or more fluid pumps and a plurality of valves for controlling the fluid to pressure actuated clutches or brakes for establishing the various driving gear ratios of the transmission. In British patent specification No. 973,493 of the Borg-Warner Corporation, a transmission mechanism is described having means for regulating the line pressure as a function of the throttle position and road speed, so that the line pressure may be regulated to a fairly high value, for starting the vehicle, or under heavy conditions of load, and under high speed, or light loads, the line pressure is kept comparatively low so that engagement and disengagement of the various clutches and brakes can be effected with a minimum of lurch or shock.

In the described construction of transmission mechanism a manually controlled selector valve inter alia controls the feed of the line pressure to two shift valves, the position of which is determined by hydraulic pressure supplied by valves actuated by a governor responsive to road speed and by the position of the throttle of the vehicle. According to the position of the two valves, the line pressure is fed to the clutches or brakes to effect the engagement of the desired gear ratios for particular driving conditions.

According to one aspect of the present invention, we provide for an automatic transmission mechanism for an automotive vehicle having a throttle for controlling the engine and a governor responsive to vehicle speed and a fluid pressure actuated servo for effecting change of gear down from the top gear, a hydraulic control mechanism comprising a source for supplying fluid under pressure to a manual selector valve for determining the desired gear range, a shift valve for determining the feed of line pressure to said servo, said shift valve being subjected to pressure from said governor and means for feeding line pressure to said shift valve, when the manual valve is moved to select a low speed drive condition, whereby movement of said shift valve to a down-shift position will not occur until the governor pressure has fallen below a given value.

The line pressure is preferably fed firstly to one part of said shift valve and secondly to a centre portion of the shift valve, where it tends to shift the valve to the downshift position, the spool of the shift valve being split at this point, to permit the portion of the shift valve controlling the downshift to be maintained in the up-shifted position until the governor pressure acting in the opposite direction on said portion of the spool falls below the given value.

In the conventional hydraulic control system, when the manual selector valve is moved to the low speed position, the shift valve which effects shift between the first and second gears is locked in the first gear position by line pressure applied to the spool valve in opposition to the governor pressure. Since this line pressure is always in excess of the governor pressure no upchange to second gear can be effected.

According to the present invention, a further shift valve is incorporated, this shift valve being shifted in response to increased throttle pressure, or alternatively to increased governor pressure, to cut off the feed of line pressure to the shift valve for effecting the first and second gear shift whereby when the throttle pressure or governor pressure exceeds a given value, the line pressure is cut off from the further shift valve and the governor pressure can move the shift valve to cause the shift to second gear, if the level of line pressure is of a sufficiently high amplitude.

In order that the invention may be more readily understood, the following description is given, merely by way of example, reference being made to the accompanying drawings, in which:

FIGURE 1 is a schematic hydraulic mechanism showing a portion of a control system according to the present invention; and FIGURE 2 shows a modification of the mechanism of FIGURE 1.

The control system illustrated in the drawing is generally similar to the control system illustrated in the Borg-Warner Corporation patent specification No. 973,493. One difference in the basic circuit is that no facility for a $D_1$ or $D_2$ drive is given so that there is no facility for permitting the vehicle to start in intermediate gear as opposed to starting in first gear.

The running gear of the hydraulic transmission includes an epicyclic gear train, controlled by a front and a rear clutch, a front and a rear brake and a one-way brake. The various drive ratios are summarized and tabulated below for ready reference:

| Speed ratio | Front clutch | Rear clutch | Front brake | Rear brake | One-way brake | Gear ratio |
|---|---|---|---|---|---|---|
| Low | X | | | | X | 2.39 |
| Intermediate | X | | X | | | 1.45 |
| High | X | X | | | | 1.00 |
| Reverse | | X | | X | | 2.09 |
| Alternate low | | | | X | | 2.39 |

The control system of the present invention includes a manual valve A, a primary regulator valve B, a secondary regulator valve C, a throttle valve D, a down-shift valve E, a modulator valve F, a 1–2 shift valve G, a 2–3 shift valve H, a servo-orifice control valve J, a L 1–2 shift valve K, a front pump check valve L, a rear pump check valve M, and a governor valve and a converter relief check valve not shown. In addition to the above valves, the hydraulic control system also comprises an engine-driven front pump and a rear pump adapted to be driven by the driven shaft of the automatic transmission. Fluid for supplying the converter and control system is contained within a pump. The front pump is connected by means of a conduit to the primary regulator valve B and the front pump check valve L. The front pump check valve L is connected by means of a conduit 1 to the rear pump check valve M, the primary regulator valve B and the throttle valve D. The rear pump is connected to the rear pump check valve M.

The primary regulator valve B is also connected by means of a conduit 21 to the converter and to the secondary regulator valve C. Secondary regulator valve C is also connected to a conduit 23 for supplying lubricant fluid to the transmission mechanism, and through a conduit 24 to the suction line for the front pump.

The throttle valve D is connected by means of a conduit 9 to the primary regulator valve B, the modulator valve F, the down-shift valve E, and the 2–3 shift valve H. The modulator valve F is connected by means of a conduit 8 to the primary regulator valve B and, by means of a conduit 2, to the governor valve (not shown). The conduit 2 from the governor valve is also connected to the 2–3 shift valve H and the servo-orifice control valve J.

The manual valve A is connected by means of a conduit 3 to the 2–3 shift valve H, by means of a conduit 5 to the 1–2 shift valve G, and to the governor valve and the clutch apply cavity of the front clutch. The manual valve is also connected by means of a conduit 6 to the 2–3 shift valve H and to the L 1–2 shift valve K. The L 1–2 shift valve K is connected, via conduit 9a, to the throttle valve D and to the modulator F and, via, the conduit 6a, to the 1–2 shift valve G. The manual valve is further connected to the 2–3 shift valve H by the conduit 7.

Conduit 11 connects the down-shift valve E to the 1–2 shift valve G and to the 2–3 shift valve H. The 1–2 shift valve G is connected via line 13 to the rear brake servo and via the line 19 to the front brake servo. Line 10 provides a connection between the 1–2 shift valve and the 2–3 shift valve.

Line 15 provides a connection between the 2–3 shift valve H the servo-orifice control valve J and the clutch apply cavity of the rear clutch. The servo-orifice control J is also connected via the line 15 of the servo-release cavity of the front brake.

The manual valve A is used to select the various driving conditions: P for parking position; R reverse; N neutral: D for drive and L for driving in a manual low speed forward drive. The valve includes four lands $A_1$; $A_2$; $A_3$ and $A_4$ and is provided at each end with an exhaust port X.

In operation, the control system for the transmission functions as follows. The manual selector valve A is set in the neutral or park position for starting the engine. With the engine running in the neutral or park positions, fluid is drawn from the sump from the front pump, and is delivered through the front pump check valve L, and through the conduit 1, to the primary regulator valve B, to the throttle valve D and to he manual selector valve A.

The primary regulator valve piston is moved to the left against the action of its spring, due to the flow pressure acting on the differential area between the lands of the primary regulator valve piston. Movement of the piston to the left, as shown in the lower half of the drawing, opens the port FP from the front pump, and permits fluid to flow through the conduit 21 to the secondary regulator valve. When the port FP is open the pressure appearing at port FP and port RP is reduced, until the force of the spring of the primary regulator valve is balanced by the force due to the fluid pressure. The regulator valve B thus functions to regulate the pressure in line 1 hereinafter referred to as the line pressure conduit.

Fluid is also supplied through the conduit 21 to the converter. Fluid pressure within the conduit 21 is also applied through a restriction to the left-hand end of the secondary regulator valve. Pressure acting on the piston of the secondary regulator valve moves the piston to the right and enables fluid to flow through line 23, to lubricate the rotating parts of the transmission.

Release of the fluid through line 23 causes the pressure within line 21 to drop until the force developed by the spring of the secondary regulator valve is exactly balanced by the pressure acting against the piston. The secondary regulator valve thereafter regulates the fluid pressure supplied to the conduit 21 to a maximum value of approximately 40 p.s.i. If the pressure in the conduit 21 rises sufficiently high, the valve piston of the secondary regulator valve is moved further towards the right, so as to open the line 24 connected to the suction side of the front pump and permits drainage of fluid from line 21.

A forward drive power train through the transmission is conditioned by shifting the manual selector valve A into the D position i.e. one position to the right of that illustrated in the drawing. Fluid under pressure in line 1 is permitted to flow through the line 3, via a constriction therein, into the 2–3 shift valve H, the piston of which is at rest to the left as indicated in the lower half of the drawing of valve H. The passage of fluid is blocked at this point until the valve piston is moved to an upshifted position.

Fluid flowing along the line 5 is applied to the front clutch apply cavity, to the governor valve and to the 1–2 shift valve G. This valve is also in the left-hand position and fluid is again blocked.

Engagement of the front clutch and of the one-way brake of the transmission, conditions the transmission for low speed forward drive. The vehicle is set in motion by depressing the throttle pedal for increasing the driving torque supplied to the torque converter for driving the transmission. Depression of the throttle pedal moves the piston of down-shift valve E to the right, against the action of its spring which, in turn, forces the throttle piston to the right. Fluid is permitted to pass through the line 9 and through a constriction back into the throttle valve D. The net force developed by the fluid pressure tends to close the throttle valve from its main connection to line 9, and the throttle valve provides a regulated pressure in the line 9 which is a function of throttle position and will hereinafter be referred to as throttle pressure.

The throttle pressure in line 9 is applied to the right-hand end of the 2–3 shift valve H. Throttle pressure in line 9 is also applied to the left-hand end of the primary regulator valve B, where it supplements the action of the spring tending to force the regulator valve piston to the right, thereby tending to increase the pressure in the line pressure conduit 1. Throttle pressure is also applied to the modulator valve F where it acts against the left-hand end of the valve plug tending to force it to the right against the action of the spring. If the throttle pressure is sufficiently great, the valve plug is forced to the right so as to open the left-hand port to the line 8 and to permit passage of fluid thereinto. Fluid pressure in the line 8 is applied to the right-hand port in the modulator valve, where it supplements the action of the spring and tends to force the plug to the left, thereby tending to close the left-hand port to the line 8. The valve plug thereby provides a regulated output pressure which is less than the throttle pressure by a determined amount. This output pressure will hereinafter be referred to as the modulator pressure, and is applied to the right-hand end of the primary regulator valve. The modulator pressure tends to force the piston of the primary regulator valve to the left, against the combined action of the spring, and throttle pressure thereby tends to regulate line pressure in the line 1 at a lower value.

As the speed of the vehicle and the output shaft increases the governor valve permits the fluid to pass to the left-hand end of the modulator valve through line 2 and also to the servo-orifice control valve J and to the left-hand valve of the 1–2 shift valve and the 2–3 shift valve.

As the governor pressure increases with vehicle speed, the pressure acting against the left-hand face of the modulator valve piston tends to move it to the right. When the force developed by the governor pressure exceeds a force due to the throttle pressure, the valve piston of the modulator valve is moved to the right thus permitting full throttle pressure to flow into the line 8, the primary regulator valve B thereafter is regulated directly as a function of throttle pressure, rather than modulator pressure.

At some stage of the operation, when the speed of the driven shaft increases, the rear pump takes over the function of supplying fluid for the control system. In this condition, the rear pump draws fluid from the sump and discharges the fluid through the check valve M into the line 1. This fluid pressure is also effective to close the front pump valve L. Thereafter, fluid pressure supplied by the rear pump is regulated by the primary regulator valve B, and the output of the front pump is discharged, through the conduit 21, to the converter, which is regulated by the secondary regulator valve C.

An upshift from low speed forward drive to intermediate speed forward drive occurs when the governor pressure develops in line 2, sufficiently to force the 1–2 shift valve G to the right. For this shift to occur, the governor pressure must overcome the action of the spring of the valve G and the shift valve plug pressure applied against the right-hand end of the valve piston.

The shift valve plug pressure is obtained in the following manner: The throttle pressure in the conduit 9 is supplied to the 2–3 shift valve H, where it forces the piston to the left, thereby permitting fluid to flow through line 10, from which it flows back into the 2–3 shift valve H and supplements the action of the spring, tending to force the plug $H_1$ to the right. The shift plug $H_1$ thereby provides regulated pressure which is a predetermined value below throttle pressure. This regulated pressure will hereinafter be referred to as shift valve plug pressure supplied, through line 10, to the 1–2 shift valve G and, via the line 10a, to the right-hand end of the piston G, where it supplements the action of the valve spring and forces the piston $G_2$ to the left. Line pressure supplied from the line 5 develops a net force, which tends to force the shift valve piston $G_1$ to the left. This latter pressure as well as the shift valve plug pressure and force of the valve spring, must all be overcome before shift to an intermediate speed drive can occur.

An upshift to intermediate speed drive does occur at some forward vehicle speed depending upon throttle position: in a substantially closed throttle position, the upshift may occur at a speed of 7–10 miles per hour whereas under full throttle condition the up-shift will occur at approximately 30–35 miles per hour.

When the 1–2 shift valve piston $G_2$ is moved to the right, line pressure in the conduit 5 is permitted to flow into line 19 and operates the servo controlling the front brake of the transmission running gear. The front brake is engaged and the one-way brake of the running gear is permitted to over-run and the transmission is thereby conditioned for intermediate speed drive condition.

Movement of the shift valve pistons $G_1$ and $G_2$ to the right functions to cut-off the shift valve plug pressure, at the right-hand end of piston $G_2$, and also removes the differential force due to line pressure on the lands of the piston $G_1$. This ensures that a downshift to low speed forward drive does not occur except if the speed is substantially lower than that at which an up-shift occurred. Removal of the differential force due to line pressure and shift valve plug pressure also ensures rapid movement of the shift valve pistons $G_1$ and $G_2$, either up or down, once the governor pressure has reached a value at which a shift can occur.

As governor pressure increases further with vehicle speed, the force due to the governor pressure acting against the left-hand face of the 2–3 shift valve piston $H_1$, becomes sufficient to overcome the combined forces due to line pressure through line 3, throttle pressure through line 9, shift valve plug pressure through line 10 and the force due to the springs. When the shift valve piston $H_1$ is moved to the right, line pressure is fed through line 15 to operate the rear clutch.

Line pressure is also supplied from the conduit 15 to the servo-orifice control valve J into the front brake servo-release chamber. The servo-orifice control valve piston is moved to the left for this condition by a force due to governor pressure.

Movement of the 2–3 shift valve piston $H_1$ to the limit of its motion to the right causes the plug $H_3$ to block the line 10, which prevents the admission of shift valve plug pressure to the left plug $H_3$. Movement of the valve piston to the right also removes the force due to line pressure acting through line 3. Therefore the speed at which a down-shift will occur must be substantially less than that at which an up-shift occurs. A normal down-shift, from high speed forward drive to intermediate speed forward drive, occurs when the governor pressure drops to a value sufficiently low to permit the springs of valve H, and the throttle pressure acting against the shift plug $H_3$, to force the pistons $H_1$ and $H_2$ to the left, to their down-shifted position. As the shift valve piston $H_1$ moves to the left sufficiently to open the line 3, the line pressure in this line ensures that the valve piston $H_1$ moves rapidly to the left.

When the piston $H_1$ moves to the left, line pressure to the conduit 15 is cut off, and accumulated fluid within the rear clutch cavity is permitted to drain, through the conduit 15, the 2–3 shift valve, the line 7 and the manual control valve A to exhaust.

Subsequently a normal down-shift, from intermediate speed forward drive to the low speed forward drive, occurs when the governor pressure drops to a lower value and the pistons $G_1$ and $G_2$ are moved to the left under the influence of the spring. With the piston $G_1$ in its down-shifted position, line pressure from line 5 is cut off and accumulated fluid within the apply cavity of the front brake is exhausted.

A forced down-shift from direct forward drive to intermediate speed forward drive, that is a kick down from third to second, is obtained by depression of the accelerator pedal to its limit. Depressing the accelerator pedal downwardly to its limit forces the piston of down-shift valve E to the right, and uncovers line 11, which supplies fluid to the 2–3 shift valve H, where it augments the action of the springs in forcing the piston $H_1$ to the left, into the down-shift position.

A forced down-shift from intermediate to first or low speed forward drive is obtained when throttle pressure in the conduit 11 passes through the right-hand end of 1–2 shift valve piston $G_2$. Throttle pressure acting on the right-hand end of the piston $G_2$ augments the action of the spring in forcing the pistons $G_2$ and $G_1$ to the left.

A forced up-shift from either low speed forward to intermediate speed forward drive or from intermediate speed forward drive to high gear occurs when the governor pressure is sufficiently great to overcome the combined forces inhibiting an up-shift.

The servo-orifice control valve J functions to soften the engagement of the front brake in down-shifting from direct drive to intermediate drive. Softening of the engagement of the front brake is obtained by slowly draining the fluid from the servo-release cavity of the servo for the brake, via the line 15.

A low speed operating condition is obtained by shifting the manual selector valve A into the L position. In this position, line pressure in line 1 is supplied to the L 1–2 shift valve K via line 6 and also to the 2–3 shift valve H via line 6. When the shift valve piston $G_1$ is in its down-shifted position, and when the L 1–2 shift valve K is moved to the left, line pressure fluid flows via line 6 and line 6a to the right-hand end of shift valve piston $G_1$ and to a holding means on piston $G_1$ comprising the differential area between the large land on the left end thereof and the adjacent land on the right side of said large land as viewed in the drawing to hold it in the down-shift position. Fluid is also permitted to pass from conduit 6a through line 13 for filling the rear brake apply cavity and engaging the rear brake. In this condition the control system is unable to up-shift from low gear to intermediate gear, whatever value the governor pressure achieves.

However, if the throttle is depressed sufficiently, then the throttle pressure in line 9a is effective to shift the L 1–2 shift valve K to the right, and cut off communication between line 6 and line 6a. With the pressure cut off from line 6a, if the governor pressure in line 2 to the left of piston $G_1$ is sufficient, piston $G_1$ will move to the right and a shift-up to intermediate gear will be effected, as hereinbefore described.

Thus, the provision of the L 1–2 shift valve responsive to throttle pressure is effective to permit the transmission to shift into second gear when in the L range.

However, as long as the accelerator pedal is in the zero or foot off position, the latch pressure through line $6a$ is present and no 1–2 up-shift will occur. This achieves two objectives, firstly for foot off maximum engine braking conditions, the transmission remains in low gear, and, secondly, for extreme mountainous conditions the transmission will perform as a two-speed unit in the L range shifting from low speed to intermediate speed and vice versa as directed by the accelerator pedal position.

In the L range, line pressure is also fed via line 6 to a position between pistons $H_1$ and $H_2$ of the 2–3 shift valve H. Thus, if the manual selector valve A is moved to its L position while the vehicle is in motion and the 2–3 shift valve is up-shifted, piston $H_1$ is subjected to line pressure both via line 3 and via line 6. If the governor pressure in line 2 to the left of piston $H_1$ is at a sufficiently high value, no down-shift will be possible. Hence, top gear is retained at high speed, the 2–3 shift valve is thus governor pressure conscious, and the 3–2 down-shift will occur at a predetermined vehicle speed whatever the accelerator position or torque condition. Thus, no severe racing of the engine will result if a selection of the L position is effected, when the vehicle is moving at a very high speed.

When one wishes to obtain a reverse drive condition, the manual selector valve A is moved to the R position. When in this position, the exhaust port at the right-hand end of the manual selector valve is blocked and line pressure is supplied from line 1, through lines 6 and $6a$, to hold valve $G_1$ in the down-shift position. The line pressure also flows through line 13 to the rear servo for applying the rear brake.

Line pressure fluid supplied to the selector valve A is also permitted to flow, through the line 7, to the 2–3 shift valve H, and thence, via the line 15, to the rear clutch apply cavity, the servo-orifice control valve K and the release cavity of the front brake.

The front servo apply line 19 is drained through the exhaust X in the 1–2 shift valve G. With the manual selector valve in the R position the line 5 is connected directly to sump and is thus drained, so that the front clutch becomes disengaged and no fluid pressure is supplied to the governor valve, and thus there is no governor pressure supplied to any of the shift valves tending to change the driving conditions established.

In the modification illustrated in FIGURE 2, the left-hand side of the L 1–2 shift valve K is connected to line 2, instead of to line $9a$, and the valve is thus moved to the right in response to governor pressure exceeding a certain value, rather than to a predetermined throttle pressure. With this arrangement the feature of no up-shift at closed throttle is lost, but the transmission will shift from 1–2 and from 2–1, at predetermined road speeds in the L range, regardless of throttle position.

We claim:
1. An automatic transmission mechanism for an automotive vehicle including a hydraulic control mechanism, a source for said control mechanism, a governor mechanism connected to said source and adapted to produce a governor fluid pressure variable in response to vehicle speed, a first fluid pressure responsive means actuatable to establish a low speed drive condition in said transmission mechanism, a second fluid pressure responsive means actuatable to establish a higher speed drive condition in said transmission mechanism, a manual selector valve connected to said source, a shift valve connected between said selector valve and said first and second fluid pressure responsive means, said shift valve having an upshifted position in which said source is connected to said second fluid pressure responsive means and a downshifted position in which said source is connected to said first fluid pressure responsive means, said shift valve being connected to said governor fluid pressure and said governor fluid pressure urging said shift valve to its upshifted position, a first area on said shift valve being connected to said source when said shift valve is in said downshifted position and tending to hold said shift valve in said downshifted position, said connection between said first area and said source being interrupted when said valve moves to said upshifted position, a second area on said shift valve being connected to said source when said manual selector valve is moved to a particular position to establish said low speed drive condition, said second area producing a force on said shift valve urging movement of said shift valve to its downshifted position, whereby said shift valve moves to its downshifted position only after said governor pressure has fallen below a given value.

2. A hydraulic control mechanism according to claim 1 wherein said shift valve includes a spool, said source of pressure is connected firstly to said means on said shift valve to maintain the transmission in said higher speed drive condition and secondly to a center portion of the shift valve, where it tends to shift the valve to the downshifted position, the spool of the shift valve being split at said center portion, to permit a portion of the shift valve to be maintained in the upshifted position until the governor pressure acting in the opposite direction on said portion of the spool falls below the given value.

3. A hydraulic control mechanism according to claim 1 wherein said transmission includes a third fluid responsive means actuatable to establish a lowest speed drive condition in said transmission mechanism, throttle pressure means connected to said source and said throttle and adapted to produce a throttle pressure variable with actuation of said throttle, said mechanism further including a second shift valve connected to said source of pressure, said second shift valve having holding means thereon normally connected to said source by said manual selector valve to hold said second shift valve in its downshifted position when said manual valve is in said particular position, said second shift valve having a downshifted position connecting said third fluid responsive means to said source and an upshifted position connecting said source to said first fluid responsive means, and a further valve connected to said throttle pressure so as to be shifted in response to increased throttle pressure to cut off the feed of pressure to said holding means to permit said second shift valve to move to its upshifted position, whereby when the throttle pressure exceeds a given volume the pressure is removed from said holding means and the governor pressure can move said second shift valve to cause the shift to said low speed drive condition if the level of the governor pressure is of a sufficiently high magnitude.

4. A hydraulic control mechanism according to claim 1, wherein said transmission includes a third fluid pressure responsive means for establishing a lowest speed drive ratio, and said mechanism further including a second shift valve having positions connecting said source of pressure to said first fluid responsive means or said third fluid responsive means, said second shift valve having holding means thereon normally connected to said source by said manual selector valve to hold said second shift valve in its position connecting said source to said third fluid responsive means when said manual selector valve is moved to said particular position, and a further valve which is connected to said governor fluid pressure so as to be shifted in response to increased governor pressure to remove the connection of said source of pressure with said holding means whereby when the governor pressure exceeds a given value, the pressure is removed from said holding means and the governor pressure can move said second shift valve to cause the shift to said low speed drive condition, if the level of the governor pressure is of a sufficiently high magnitude.

5. An automatic transmission for an automotive vehicle having a throttle for controlling the engine, a first fluid pressure actuated servo for establishing a lower speed ratio in said transmission mechanism and a second fluid pressure actuated servo for establishing a higher speed ratio in said transmission mechanism, a hydraulic control mechanism comprising a source for supplying fluid under pressure, throttle pressure means connected to said throttle and said source and adapted to develop a throttle pressure varying with actuation of said throttle, a governor being connected to said source and adapted to develop a governor fluid pressure variable with vehicle speed, manual selector valve for determining the desired gear range, a shift valve connected to said governor pressure and having an upshifted position connecting said source to said second servo, said shift valve having a downshifted position connecting said source to said first servo, said shift valve having holding means thereon normally connected to said source by said manual selector valve to hold said shift valve in its downshifted position when said manual selector valve is in a position selecting said lower speed ratio, and a valve which is connected to said throttle pressure so as to be shifted in response to increased throttle pressure to remove the connection between said source and said holding means to permit said shift valve to move to its upshifted position, whereby when the throttle pressure exceeds a given value the governor pressure can move said shift valve to cause the shift to said higher speed ratio, if the level of the governor pressure is of a sufficiently high magnitude.

6. An automatic transmission mechanism for an automotive vehicle having a throttle for controlling the engine a first fluid pressure actuated servo for establishing a lower speed ratio in said transmission mechanism and a second fluid pressure actuated servo for establishing a higher speed ratio in said transmission mechanism, a hydraulic control mechanism comprising a source of supplying fluid under pressure, a governor connected to said source and adapted to supply a governor fluid pressure variable with vehicle speed, a manual selector valve for determining the desired gear range, a shift valve connected to said governor pressure and having an upshifted position connecting said source to said second servo and a downshifted position connecting said source to said first servo, said shift valve having holding means thereon normally connected to said source by said manual selector valve to hold said shift valve in its downshifted position when said manual selector valve is in a position selecting said lower speed ratio, and a valve which is connected to said governor pressure so as to be shifted in response to increased governor pressure to remove the connection between said source and said holding means to permit said shift valve to move to its upshifted position whereby when the governor pressure exceeds a given value said shift valve can move to cause a shift to said higher speed ratio, if the level of governor pressure acting on said shift valve is of a sufficiently high magnitude.

References Cited
UNITED STATES PATENTS

| | | | |
|---|---|---|---|
| 2,893,261 | 7/1959 | Flinn | 74—869 |
| 3,003,368 | 10/1961 | Winchell | 74—752 |
| 3,056,313 | 10/1962 | Lindsay | 74—752 |
| 3,083,589 | 4/1963 | Knowles et al. | 74—677 |
| 3,167,970 | 2/1965 | Wagner et al. | 74—869 |
| 3,400,612 | 9/1968 | Pierce | 74—864 |
| 3,424,037 | 1/1969 | Searles | 74—869 |

ARTHUR T. McKEON, Primary Examiner